United States Patent Office 3,374,324
Patented Mar. 19, 1968

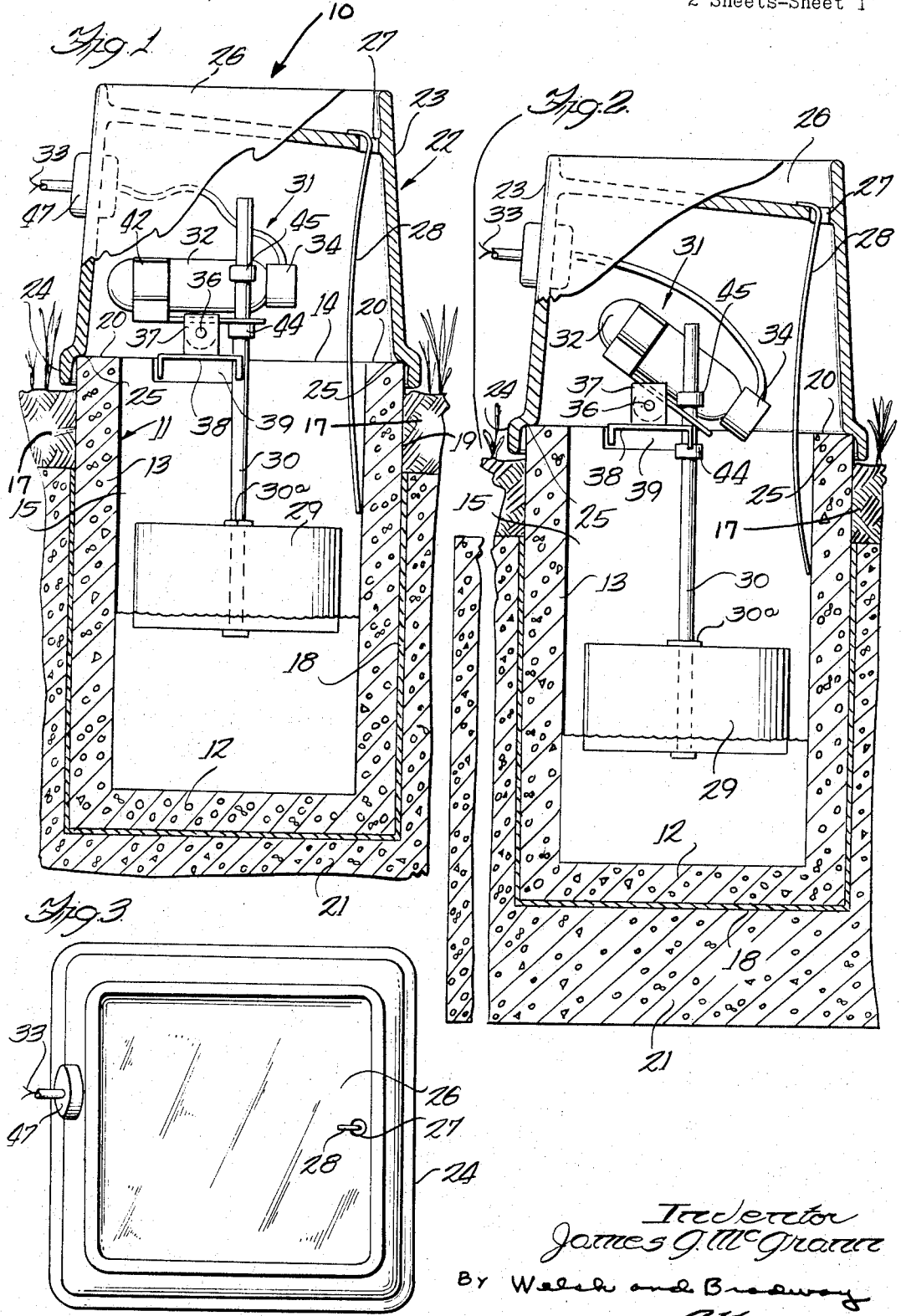

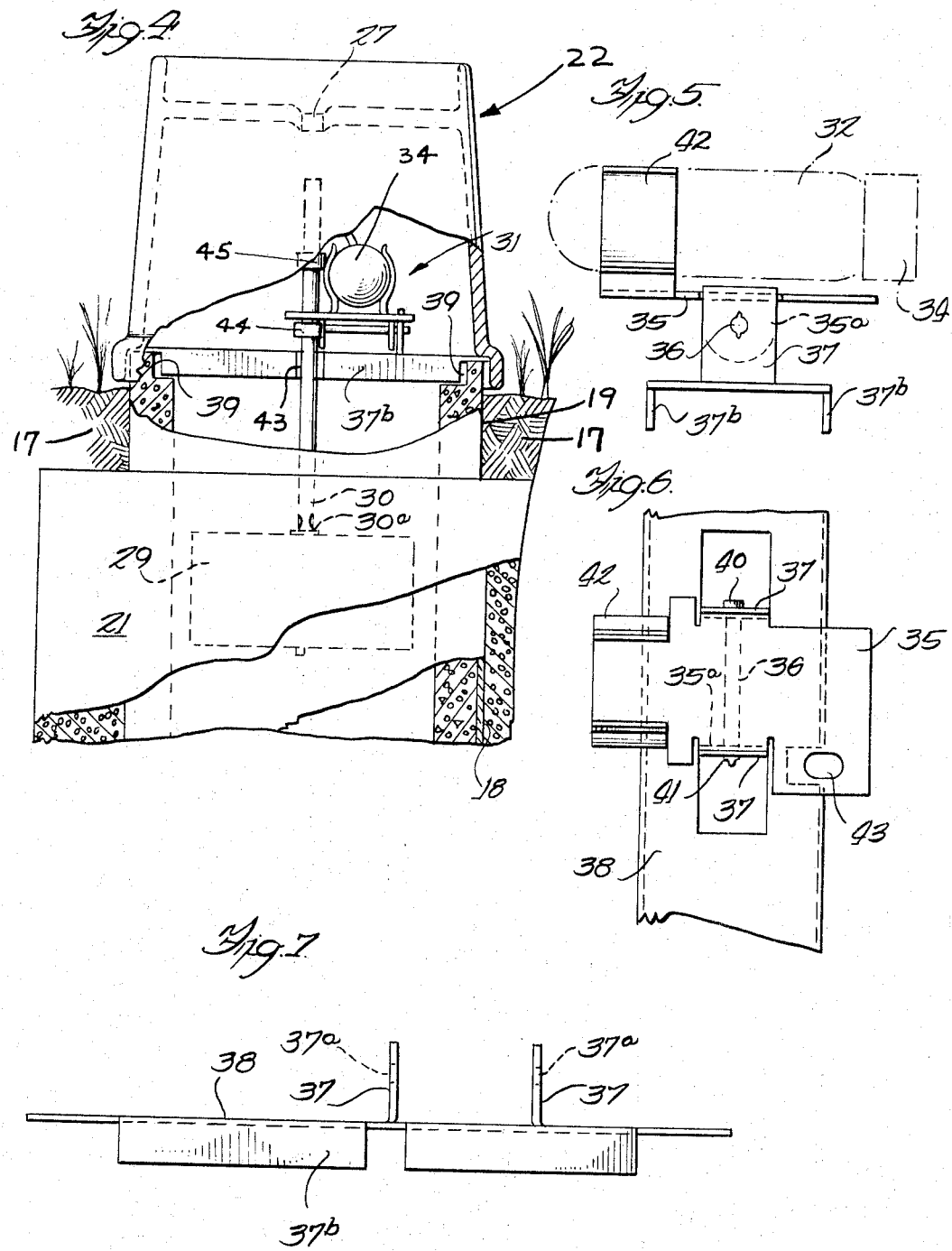

3,374,324
MOISTURE CONTROL APPARATUS
James G. McGrann, R.R. 2, Bloomington, Ill. 61701
Filed June 24, 1964, Ser. No. 377,552
5 Claims. (Cl. 200—84)

This invention relates to an apparatus for detecting the loss of moisture in soil and providing a signal which may be utilized to control the delivery of water to the soil as by a sprinkler system.

The principal object of this invention is to provide an apparatus for detecting and indicating alternately the loss of moisture in upper layers of soil and the delivery of a predetermined quantity of water to the soil to replenish the moisture.

Another object is to provide novel moisture sensing apparatus adapted, upon changes in the moisture content of the soil, to give a signal which can be utilized to control the delivery of water to the soil by a water distribution system.

A further object is to provide novel soil monitoring apparatus in which a decrease in the moisture content of the soil being monitored and a delivery of moisture to the soil results in easily detectable changes in the level of water contained in the apparatus.

A more detailed object is to utilize capillary action to transfer the stored water to the top layers of soil and thereby reduce the level of stored water in accordance with decreases in the moisture content of the soil.

A further detailed object is to store the water in a container having walls of porous material which functions as a wick to transfer water from the apparatus to the top layers of surrounding soil.

Another object is to restore the water level in the container in proportion to the amount of water delivered to the soil surrounding the apparatus.

Still another object is to provide novel signal means to indicate high and low water levels in the apparatus.

A further object is to provide a novel signaling means which is of simple construction and can be easily adjusted to indicate a variety of high and low water levels in the apparatus.

Other objects and advantages of the invention will become apparent from the following description taken in connection with the accompanying drawings in which:

FIGURE 1 is a cross-sectional view taken along a vertical plane through the apparatus and showing the float in an upper limit position;

FIG. 2 is a cross-sectional view similar to that of FIGURE 1 but showing the float in a lower limit position;

FIG. 3 is a top plan view of the apparatus;

FIG. 4 is a fragmentary end elevational view of the apparatus partially broken away to show the switch and float mechanism.

FIG. 5 is an enlarged side elevational view of the mounting plate and carriage for the mercury bulb;

FIG. 6 is a fragmentary plan view of the mounting plate and carriage shown in FIG. 5; and FIG. 7 is an enlarged side elevational view of the mounting plate for the mercury bulb carriage.

The present invention is shown in the drawings for the purposes of illustration embodied in an apparatus 10 which is intended to be inserted in soil for the purpose of detecting and indicating alternately the loss of a predetermined amount of moisture from the soil and the delivery of a measured quantity of water to the soil by rainfall or artificial means such as sprinklers. In accordance with one aspect of the invention, the apparatus 10 is constructed so that it can detect and indicate the loss of moisture in the upper layers 17 of soil surrounding the apparatus. To detect this loss of moisture, the apparatus includes a water storage container and means to transfer the stored water to the soil as the soil loses moisture and in amounts proportional to the loss. In this instance, the water storage container is a hollow structure 11 having an open top 14 and a shell comprised of a bottom wall 12 and side walls 13 which define a cavity 15 for storing the water. This structure is inserted in an opening in the soil to be monitored with the open top extending slightly above the top of the soil. Capillary action is utilized to transfer the water to the soil and, for this purpose, a wick is positioned to contact the water in the cavity and the upper layers 17 of soil surrounding the structure. While a separate member can be utilized as the wick, economy of construction is achieved by forming the side walls 13 of a porous material so that these walls themselves function as the wick as well as form a part of the water storage container. Concrete has been found to perform satisfactorily for this purpose, the bottom wall preferably being formed of the same material so that the water storage and transfer means is simply a hollow concrete block having one open end.

To limit water transfer to the upper layer of soil with the hollow concrete block as the water storage and transfer means, a waterproof coating 18 is applied to the exterior surfaces of the bottom wall 12 and lower portions of the side walls 13 of the block. This coating then cooperates with the bottom wall and lower parts of the side walls to form the waterproof container. The coating may be of any suitable material such as plastic or metal, for example, aluminum and, being applied to the outside surfaces of the walls, permits the inner surfaces to contact water in the cavity so as to function as a wick.

In the embodiment shown in the drawings, the uncovered upper portions 19 of the side walls 13 extending downwardly to a plane about 1½ inches below the top edges 20 of the block are not waterproofed. These upper portions of the side walls contact the top layers 17 of the soil surrounding the apparatus and water is transferred from the cavity to the top layers of soil through the external surfaces of these walls as the soil dries. Thus, the apparatus is sensitive only to a decrease in moisture in the top layers of soil. The sensitivity of the apparatus in detecting the reduction in moisture is increased by providing a back fill of material 21, such as pea gravel, around the block and below the top layers of soil so that moisture drains rapidly from these top layers. A layer of pea gravel extending a distance of approximately one inch beyond the side walls and below the bottom wall of the block has proved satisfactory.

The supply of water in the apparatus 10 is replenished automatically as an incident to the delivery of moisture to the soil and in an amount proportional to such delivery. For this purpose, a portion of the water delivered to the soil either as rain or artificially is intercepted and transferred to the cavity 15 in the block 11. Such interception is accomplished with a catcher 22 providing an upwardly open basin 26 and communicating with the cavity through a passageway 27. To simplify the construction, the catcher preferably serves also as a cover for the open end of the block.

In the present instance, the cover 22 is formed as a hollow, one-piece casting, preferably of aluminum, of rectangular cross section with side walls 23 which diverge outwardly from a closed top to an open bottom. A skirt portion 24 extends outwardly from the bottom of the cover to provide a flange 25 to rest on the top edges 20 of the side walls 13 of the block 11 and to cover the outer perimeter of the top edge of the block. The top portion of the cover is recessed to form the basin 26 which has approximately the same cross sectional area as the cavity 15 in the block. The passageway 27 is simply an opening formed in the basin at one side thereof and the bottom surface of the basin is sloped toward this opening to cause the water which accumulates therein to flow through the opening and into the cavity 15 in the block. To direct the water to the cavity and away from the top edges 20 of the walls of the block, a suitable guide such as a wire 28 is hooked over the top portion of the cover and extends through the opening and into the cavity.

When water is delivered to the soil surrounding the apparatus, a portion of this water is caught in the basin 26 of the cover 22 and delivered to the cavity 15 to raise the level of water in the cavity. As the top layers 17 of soil around the apparatus lose moisture, the water is transferred from the cavity to the soil to lower the level of water in the cavity. Accordingly, the water level in the cavity changes directly as the moisture content of the surrounding soil changes.

In accordance with another aspect of the present invention, novel means is provided to detect and signal changes in the water level in the cavity 15. This means is both simple in construction and adjustment and reliable in operation and includes a float 29 supported by the water and movable vertically in the cavity 15 along with the top surface of water. Herein, the float is a cylindrical piece of styrofoam having an axial opening receiving an aluminum rod 30 which is coaxial with the opening and is secured to the float as by crimping the rod immediately above and below the end surfaces of the float. A washer 30a is installed between the top surface of the float and the crimped part of the rod above the float to resist tearing of the float.

Cooperating with the float 29 and rod 30 to signal changes in the water level is an electric switch 31 which may be located in the energizing circuit of suitable indicators or a water flow control device (not shown) to energize and de-energize the device in response to high and low water conditions. In this instance, the switch is connected to the float and the rod through a lost motion connection so that it is actuated only when the float reaches predetermined upper and lower water level positions in the cavity. This is accomplished easily by utilizing a mercury-type of switch with a bulb 32 which is pivotally supported above the cavity so that it can be tilted by the rod 30 to and from first and second circuit completing and interrupting positions.

The mercury bulb is of the conventional type having lead-in wires 33 connected to spaced contacts (not shown) located at one end 34 of the bulb. When the bulb is tilted so that the end containing these contacts is inclined downwardly, clockwise as shown in FIGS. 1 and 2, the mercury flows to this end of the bulb and covers the contacts to complete a circuit through the lead-in wires. When the bulb is tilted in the opposite direction so that the contact end is raised, the mercury flow away from the contacts and the circuit is interrupted.

In order to permit the bulb 32 to be tilted by the rod 30, the bulb is clamped to a carriage in the form of a plate 35 which pivots about a horizontal pin 36 positioned above the top of the block 11. The pin is journalled in openings 37a in upstanding legs 37 of a mounting plate 38 which spans the cavity 15. Downwardly extending legs 37b of the plate rest in notches 39 cut in oppositely spaced top edges 20 of the side walls 13 of the block, the depending legs engaging the defining edges of the notches to fix the position of the plate relative to the walls. The carriage 35 is positioned between the upstanding legs of the mounting plate and has depending legs 35a with aligned apertures receiving the pivot pin.

To secure the pivot pin 36 in the supporting position for the carriage, a head 40, larger than the openings in the mounting plate legs 37, is provided at one end of the pivot pin and the opposite end thereof is crimped at 41 on the outside of the opposite leg 37 after the pin is placed through the openings in the mounting plate legs and the carriage legs 35a. For ease of manufacture, the legs 37 are formed as bent-up portions of the mounting plate. The bulb is held in place on the carriage 35 by a pair of laterally spaced resilient clamping members 42 which are bent up from the carriage plate and grip one end of the bulb, preferably the end located away from the lead-in wires 33. With this construction, the mercury bulb can easily be replaced.

The lost motion connection between the rod 30 and the carriage 35 supporting the mercury bulb 32 is constructed in a novel manner to permit the switch to be adjusted to operate at a variety of water levels in the cavity 15 and only when the water level reaches these predetermined positions. To this end, the rod extends through an opening 43 formed in the carriage plate and having larger dimensions than the rod to permit the rod to move vertically relative to the carriage. To utilize rod movements to shift the carriage, the opening is spaced from the pivotal axis defined by the carriage pin 36 and stops or contacting members 44 and 45 larger than the opening are supported in spaced positions along the rod on opposite sides of the carriage plate. During movement of the rod vertically through the opening 43 and relative to the carriage plate, these members engage the plate to rotate it and the mercury bulb about the pivot to actuate the switch. The members are adjustable to different positions along the rod to vary the water level at which the switch is actuated.

Adjustment of the contacting members is achieved in a simple manner by forming the members as rings of elastic material contracted around the rod. Their outer diameters are greater than the width of the opening 43 in the carriage and their inner diameters, when they are relaxed, are slightly less than the diameter of the rod so that it must be expanded to fit around the rod. Because of their elasticity, the rings can be moved easily to any position along the rod to actuate the switch at different desired water levels in the cavity. In the present instance, the mercury bulb 32 is positioned on the carriage 35 with the end portion 34 containing the lead-in wires 33 located on the same side of the pivot pin 36 as the opening 43 so that a tilting of this side of the carriage downwardly will complete the circuit through the lead-in wires. The latter extend through a rubber grommet 47 in an opening 46 in a wall 23 of the cover 22.

To place the apparatus 10 in operation, the cavity 15 is filled with water to a level which raises the float 29 high enough that the lower ring 44 on the rod engages and tilts the switch carriage 35 to open the circuit through the lead-in wires 33. The float and switch will then be in the position shown in FIG. 1. As the soil surrounding the apparatus dries, water is drawn through the porous walls 13 of the hollow block 11 and out through the non-waterproof upper portions 19 of the walls which are in contact with the top layers 17 of soil.

As the water level in the cavity 15 is reduced due to the capillary transfer of water into the top layers of soil, the float 29 drops in the cavity and the rod 30 slides downwardly through the opening 43 in the mercury bulb carriage 35 until the upper collar 45 on the rod engages the carriage and tilts the carriage and mercury bulb 32. When a predetermined lower water level is reached in the cavity, the mercury flows to the end of the bulb containing the lead-in wires 33 and completes a circuit across their contacts to complete a circuit such as the energizing circuit of a solenoid valve of a lawn sprinkler system. Actuation of this valve allows water to flow to sprinklers for discharge onto the soil surrounding the apparatus. Some of this water falls on the cover 22 of the apparatus and collects in the basin 26 from which it is directed through the opening 27 and into the cavity to raise the level of water therein.

As the moisture increases in the soil around the apparatus due to the discharge of water from the sprinklers, the water level in the cavity 15 also rises because of the water collected by the cover 22. As the water level rises, the float 29 and rod 30 also rise with the rod passing through the opening 43 in the carriage 35 until the lower collar 44 on the rod engages the carriage and tilts the carriage and the mercury bulb 32. When the float reaches a predetermined upper position, the mercury flows away from the contacts of the lead-in wires 33 and interrupts the circuit. The solenoid valve in the sprinkler system then closes to stop the discharge of water to the soil. The apparatus thus completes a cycle which will be repeated when the soil adjacent the container loses moisture.

I claim:

1. An apparatus for alternately completing and interrupting an electrical circuit in response to a reduction in moisture in soil surrounding said apparatus and in response to a delivery of a predetermined quantity of water to the vicinity of the apparatus, said apparatus including a hollow concrete block having bottom and side walls and an open top leading to a cavity in said block, a waterproofing material covering the exterior surfaces of the bottom wall and lower portions of the side walls of said block to form the lower portion of the block into a watertight container, said block being insertable in soil with the top thereof positioned adjacent the top of the soil and having upper and non-waterproofed portions of said side walls in contact with upper layers of said soil to function as a wick to transfer water from said cavity to said upper layers of said soil, a mercury switch rigidly supported on a carriage mounted above said cavity for pivotal movement about a horizontal axis, said mercury switch having lead-in wires adapted to be connected to an electric circuit with the switch being adapted to alternately interrupt and complete said electric circuit upon pivotal movement about said horizontal axis, a float positioned in said cavity for vertical movement in response to changes in the water level in the cavity, an elongated rod rigid with and extending upwardly from said float and through an opening in said carriage for guided vertical movement relative thereto, stops spaced apart longitudinally along said rod and engageable with said carriage to transmit movement of the rod to the carriage, said stops being adjustable along the length of said rod to be engageable with said carriage when said float is moved to predetermined vertical positions in said cavity in response to changes in said water level, and means to collect a portion of water delivered to the vicinity of the apparatus and transfer it to said cavity.

2. An apparatus for detecting and indicating a reduction in the moisture content of upper layers of soil to a predetermined amount and the delivery of a measured quantity of water to said upper layers of soil, said apparatus including a hollow body having a porous shell and at least one opening through said shell and into the hollow portion of said body, said body being adapted to be inserted in soil with a portion of said shell contacting the upper layers of said soil and positioned with said opening facing in a generally upwardly direction, a waterproofing material covering the exterior of said shell below said upper layers of soil to define a container for holding water for transfer to the upper layers of soil by capillary action through the shell as the moisture content of the upper layers decreases, means to intercept a portion of the water delivered to the upper layers of soil in the vicinity of said apparatus and channel said water through said opening and into the hollow portion of said body, and means to detect and indicate preselected high and low levels of water in said container.

3. An apparatus for detecting and indicating a reduction in the moisture content of upper layers of soil to a predetermined amount and the delivery of a measured quantity of water to said upper layers of soil, said apparatus including an elongated hollow concrete block of generally rectangular cross section having bottom and side walls surrounding a cavity and an open top leading into said cavity, a waterproof coating covering the exterior of the bottom wall and the lower portions of the side walls of the block to form a portion of said cavity into a container for water, said block being adapted for insertion in the soil to be monitored in an upright position with the upper and non-waterproof portions of said side walls in contact with the upper layers of soil for transfer of said water from the cavity and through the walls into the soil as the moisture content of the soil decreases and the open top extending above the upper layers of soil to intercept a portion of water falling on said soil, and means mounted on said block to detect and indicate preselected high and low water levels in said cavity.

4. An apparatus for detecting and indicating a reduction of moisture in upper layers of soil to a predetermined amount and the delivery of a measured quantity of water to said soil, said apparatus including a container for water adapted to be inserted in the soil to be monitored and having a wick positioned to contact the water in the container and the upper layers of soil to transfer water by capillary action from the container to the soil as the moisture content of the soil decreases, a float positioned in said container, a mercury switch pivotally mounted above said container for movement between first and second signal actuation positions, an actuating arm connected to said switch and having an opening extending therethrough, a rod rigid with said float and extending through said opening in said arm for guided linear movement relative thereto, a pair of elastic, resilient rings adjustable along the length of said rod and positioned on opposite sides of said arm, each of said rings having an outer diameter greater than the width of said opening in said arm to prevent said ring from passing through said opening and an inner diameter less than the diameter of said rod to retain the ring in selected positions of adjustment along the length of the rod, and means to intercept a portion of water falling on said soil and to deliver said water to the container, vertical movement of said float in response to changes in the level of water in said container causing movement of said rod through said opening and relative to said arm to bring said rings alternately into contact with the arm to move the switch into and out of said first and second signal actuation positions.

5. An apparatus for detecting and indicating changes in the amount of moisture in a quantity of soil, said apparatus including a container for water, means for varying the level of water in said container in accordance with changes in the moisture content of the soil, a float positioned in said container, a mercury switch pivotally mounted above said container for movement between first and second signal actuation positions, an actuating arm connected to said switch and having an opening extending therethrough, a rod rigid with said float and extending through said opening in said arm for guided linear movement relative thereto, and a pair of elastic, resilient rings adjustable along the length of said rod and positioned on opposite sides of said arm, each of said rings having an outer diameter greater than the width of said opening to prevent said ring from passing through said opening and an inner diameter less than the diameter of said rod to retain the ring in selected positions of adjustment along the length of the rod, vertical movement of said float in response to changes in the level of water in said container causing movement of said rod through said opening and relative to said arm to bring said rings alternately into contact with the arm to move the switch into and out of said first and second signal actuation positions.

References Cited

UNITED STATES PATENTS

| | | | |
|---|---|---|---|
| 626,226 | 11/1896 | Elliott | 73—322 |
| 2,023,490 | 12/1935 | Richards | 73—73 |
| 2,084,005 | 6/1937 | Richards | 239—44 |
| 2,284,158 | 5/1942 | Lewis | 239—65 |
| 2,335,716 | 11/1943 | Weeden | 239—65 |
| 2,344,202 | 3/1944 | Carlson | 239—44 |
| 2,346,029 | 4/1944 | Jennings | 239—44 |
| 2,445,717 | 7/1948 | Richards | 239—63 |
| 2,674,490 | 4/1954 | Richards | 239—64 |
| 2,893,641 | 7/1959 | Hunter | 239—64 |
| 2,991,938 | 7/1961 | Norcross | 239—65 |

RICHARD C. QUEISSER, *Primary Examiner.*

JAMES GILL, *Examiner.*

J. H. WILLIAMSON, *Assistant Examiner.*